UNITED STATES PATENT OFFICE.

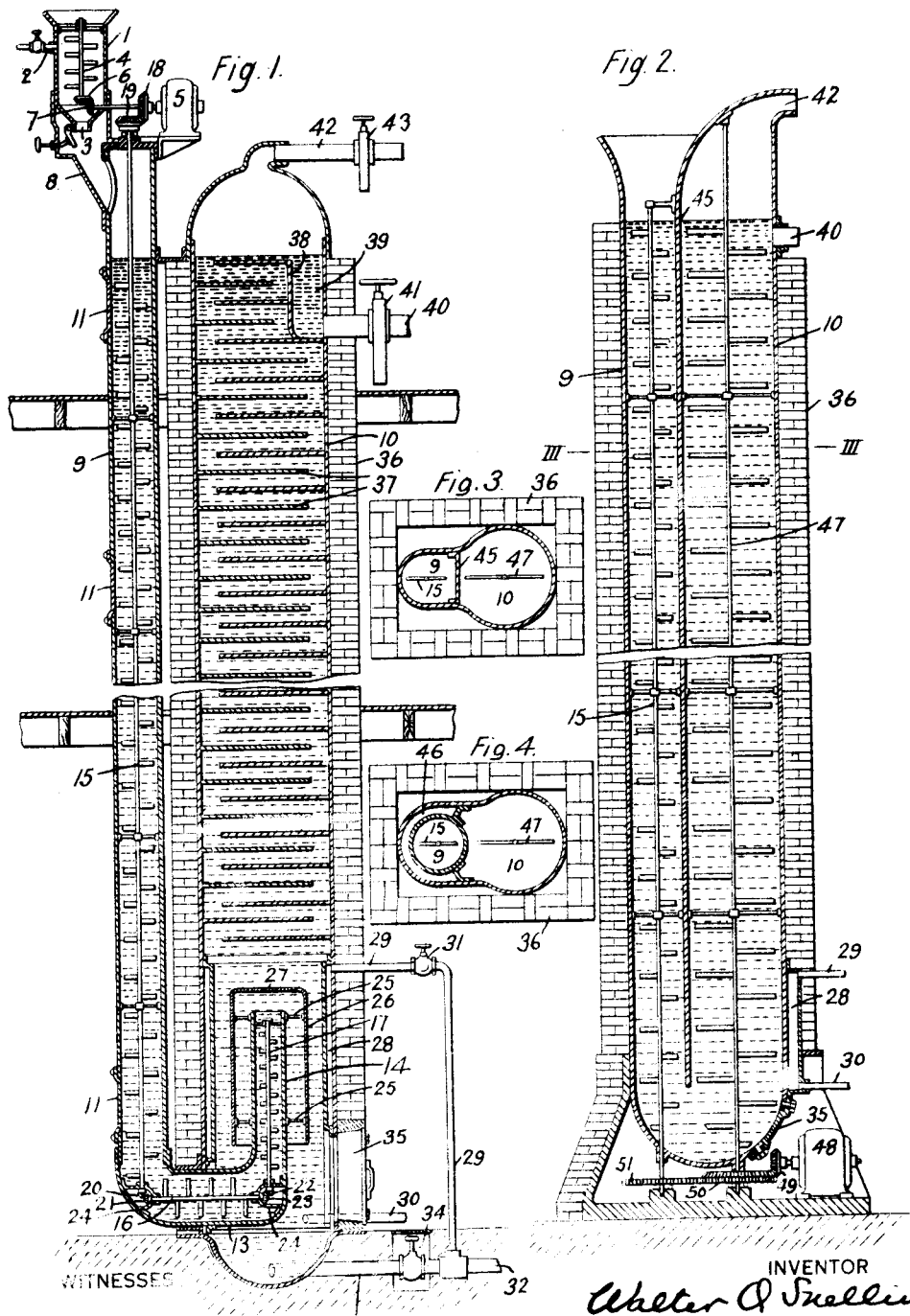

WALTER O. SNELLING, OF LONG ISLAND CITY, NEW YORK.

PREPARATION OF AMMONIA.

1,365,739.  Specification of Letters Patent.  Patented Jan. 18, 1921.

Application filed March 24, 1916. Serial No. 86,373.

*To all whom it may concern:*

Be it known that I, WALTER O. SNELLING, a citizen of the United States, and a resident of Long Island City, in the county of Queens and State of New York, have invented a new and useful Improvement in the Preparation of Ammonia, of which the following is a specification.

My invention relates to chemical manufactures involving reactions which take place in the presence of liquids or vapors, and which are produced or accelerated by temperatures above the boiling points of the liquids involved. It has special relation to the production of ammonia by reaction between aqueous fluids and cyanamid or its salts, particularly commercial calcium cyanamid.

One object of my invention is to improve and simplify the methods and apparatus which have heretofore been employed for performing reactions of the above-indicated character, by utilizing the pressure of one portion of the reaction material to substantially raise the boiling point of the liquid present in the reaction zone.

Another object of my invention is to provide an effective and substantially continuous process of producing ammonia by reacting upon cyanamid and its salts, especially calcium cyanamid.

A further object of my invention is to provide novel, simple and relatively inexpensive apparatus, of large capacity, for carrying out the foregoing process.

In the accompanying drawings, Figure 1 is a vertical sectional view showing, somewhat diagrammatically, a portion of an ammonia plant constructed in accordance with one modification of my invention; Fig. 2 is a vertical sectional view of a modified form of apparatus, similar in a general way to that shown in Fig. 1; Fig. 3 is a transverse sectional view of the structure shown in Fig. 2, the section being taken substantially along the line III—III, Fig. 2; Fig. 4 is a transverse sectional view, similar to Fig. 3 but showing a modified construction.

A well known commercial method of preparing ammonia consists in treating crude calcium cyanamid (lime nitrogen) with water or steam. Since this reaction becomes active only at temperatures above 100° C., and since the reaction is accelerated at a very rapid rate as the temperature rises, it is customary to carry out the process in high-pressure autoclaves, which, on account of the rapid evolution of ammonia, must be exceedingly strong. The pressures within the autoclaves often rise to 225 or 250 pounds per square inch, and autoclaves capable of withstanding such internal pressures, and having the capacity necessary for commercial operation, are so costly that the initial investment in a plant equipped in this manner is very great.

According to my present invention, I react with water upon a progressively advancing supply of cyanamid or a cyanamid salt, thereby dispensing with the use of autoclaves and considerably shortening the process. My general method consists broadly in applying the hydrostatic pressure of a descending column of liquid or semiliquid reaction material to raise the boiling point of the liquid present in a reaction zone to a point at which the reaction proceeds rapidly and efficiently. As specifically applied to the manufacture of ammonia from cyanamids, this method is utilized to raise the boiling point of water in contact with pulverized cyanamid, or a cyanamid salt, to such a point that a high yield of ammonia is obtained, while free access of reaction material is permitted and the reaction products may be withdrawn under convenient and easily controlled pressures.

In practising the above method, I make use of a new form of reaction apparatus consisting of a preferably upright charging tube of great vertical height, in comparison with its diameter, and communicating at its lower end with a reaction chamber which, in turn, communicates with a discharge tower that is preferably disposed closely adjacent to the charging tube, in order that a considerable amount of the heat liberated by the strongly exothermic ammonia-liberating reaction may be imparted to the material that is approaching the reaction zone. The height of the charging tube is so selected that it may contain a column of liquid or semi-liquid reaction material that will exert a pressure upon the contents of the reaction chamber sufficient to raise the boiling point of the liquid therein to the desired reaction temperature. Either by means of a balancing column of liquid in the discharge tower or otherwise, I provide means for creating sufficient back-pressure to nearly balance the column of material in the charging tube, enough differential pressure being maintained to cause a regular and fairly rapid flow of material through the system.

The apparatus just described may be charged with a suspension of finely pulverized commercial calcium cyanamid in sufficient water to form a thin sludge, to which small amounts of alkaline auxiliary reagents may be added, if desired, in order to increase the yield of ammonia. The reaction chamber is provided with heating means for starting the reaction, which thereafter liberates sufficient heat to carry on the process automatically.

For a more detailed discussion of my reaction apparatus, reference may now be had to the accompanying drawings, Figs. 1 and 2 of which show two modifications of apparatus suitable for carrying out the process in which hydrostatic pressure is utilized to produce the necessary reaction temperature. The system shown in Fig. 1 consists of a preliminary mixing tank 1 provided with a water inlet 2, a valve-controlled discharge opening 3 and a stirring device 4 which is rotated by means of a motor 5 through bevel gears 6 and 7. The discharge opening of the tank 1 communicates, through a closed chute 8, with the upper end of an elongated vertical charging tube 9, the height of which depends upon the reaction pressure desired and which may, with advantage, be considerably over one hundred feet high and about one foot in diameter. The charging tube is disposed adjacent to a discharge tower 10 which is of about the same height as the charging tube 9 but of considerably greater diameter. The tube 9 and the tower 10 may be circular or of any other desired cross-section and may suitably be constructed and supported within a well extending from an upper story of a tall factory building to the ground, doors 11 being provided at any desired intervals for inspection, cleaning and repair.

At its lower end, the charging tube 9 communicates with another tube having a horizontal portion 13 and a short vertical portion 14 that is centrally disposed within the lower end of the discharge tower 10. The tubes 9, 13 and 14 are provided with rotary stirrers 15, 16 and 17, respectively, all of which are driven by the motor 5 through bevel gears 18 and 19 at the top of the tube 9, and other pairs of gears 20—21 and 22—23 disposed at opposite ends of the horizontal tube 13, the two latter pairs of gears being inclosed within gear cases 24. Other forms of stirring apparatus may of course be provided for maintaining the contents of the tubes 9, 13 and 14 in a homogenous condition.

Surrounding the short vertical tube 14, and attached thereto by brackets 25, is a tubular member 26, closed at the top by a perforated plate 27 and open at its lower end. The wall of the tower 10, adjacent to the member 26, is provided with a steam jacket 28 having an inlet pipe 29 and an outlet 30. The inlet pipe 29 is controlled by a valve 31 and is connected to a source of superheated steam represented by a pipe 32, to which is also connected a pipe 33 leading to the bottom of the tower 10. A valve 34 controls the admission of steam to the pipe 33 and is intended to be operated periodically to stir up any deposits of heavy sludge that may tend to accumulate at the bottom of the tower. Deposits of sludge which may be too heavy to be disposed of by the steam agitator may be removed through a manhole 35.

In order to conserve the heat generated within the tower 10, this tower is surrounded throughout substantially its whole length by a wall 36 of silica brick or other refractory heat-insulating material. Within the tower I provide a considerable number of baffles 37 to form a devious path for the reaction products, to retard their upward progress and to keep them thoroughly mixed.

Near the top of the tower 10 is a vertical partition or dam 38, which divides off a section of this part of the tower to form a sludge-receiving chamber 39 communicating with a discharge pipe 40 that is provided with a gate valve 41. The steam and ammonia which rise to the top of the tower are removed through a pipe 42 provided with a valve 43 and leading to any suitable condensers, ammonia absorption apparatus, acid towers or gasometers, as may be desired.

In the continuous operation of the above-described apparatus, commercial calcium cyanamid is deposited in the tank 1 and mixed to a thin sludge with water or with the ammonical liquor drawn off from a previous charge. This sludge is fed into the tube 9 fast enough to keep the tube substantially full, and as the material gradually descends, it is kept in homogeneous suspension by the stirrer 15. In passing through the tubes 13 and 14 and downward between the tube 14 and the annular member 26, the sludge is preheated to a temperature which preferably approaches, but does not quite reach, the temperature at which ammonia is actively evolved. Any small amounts of ammonia that may be liberated at this point escape through the small openings in the plate 27. The main evolution of ammonia takes place in the space between the member 26 and the steam jacket 28, superheated steam being admitted to the steam jacket at the beginning of the operation in order to start the reaction, after which the process continues without additional heat.

The products of the reaction, consisting of ammonia, steam, water, finely divided calcium carbonate and residual calcium cyanamid, rise through the tower, the liquid being kept in ebullition, and prevented from settling, by the large volumes of steam and ammonia that are constantly being liberated, and the rate of upward movement being kept constant by the retarding effect of the baffles 37. I prefer that the apparatus be charged at such a rate that the discharge tower is kept substantially full of liquid, in which case the reaction products and residues are removed at about atmospheric pressure, the sludge passing over the top of the dam 38 and the ammonia and steam escaping through the outlet pipe 42. It may, however, be found convenient to withdraw the sludge intermittently at a lower level and to restrict the gas outlet to create a pressure sufficient to compensate for the difference in height between the columns of liquid in the tube 9 and the tower 10.

The foregoing treatment does not decompose all of the calcium cyanamid, and therefore the sludge delivered from the apparatus should be given a second treatment, which does not require as high pressure as the first treatment, and which may therefore be carried out in a smaller set of apparatus constructed according to my present invention or in a low-pressure autoclave.

The apparatus shown in Fig. 2 is somewhat similar to that shown in Fig. 1, and its corresponding parts are similarly numbered. This form of device, however, utilizes to a greater degree the heat evolved by the ammonia-liberating reaction as a means of pre-heating the incoming sludge. The heat-insulating wall 36 in this modification surrounds both the charging tube 9 and the delivery tower 10, which are separated only by a relatively thin heat-interchanging metal wall 45. The cross sectional structure of this modification of my device is shown in Fig. 3.

The preliminary heating of the descending sludge may be increased by providing a spaced jacket 46 around a portion or all of the tube 9, as shown in cross-section in Fig. 4, and supplying hot gases from the tower 10 to this jacket through suitable pipes. By this means, using in the heating jacket more or less of the ammonia and steam delivered from the tower 10, the temperature of the sludge may be accurately controlled. As indicated above, it is preferably brought to the reaction zone at a temperature just below the point at which the reaction takes place actively. As shown in Fig. 2, the delivery tower 10 is provided with a power-driven stirrer 47 instead of the baffles 37. The stirrers 15 and 47 are driven by a motor 48 through gears 49, 50 and 51.

It will be observed that my process is substantially continuous in its operation, and that, while the materials are all handled under atmospheric pressure, the ammonia-liberating reaction takes place at temperatures well above the boiling point of water. While I have specifically described my process and apparatus in connection with the treatment of calcium cyanamid, it is to be understood that the same principles are equally applicable to the treatment of other salts of cyanamid, or cyanamid itself, and that all of these substances are intended to be covered by the expression "a cyanamid" in the claims. It is also to be understood that numerous modifications may be made in the structural details and process steps which I have specifically shown and described and that my invention comprises all such modifications and adaptations as fall within the scope of the appended claims.

I claim as my invention:

1. The process of preparing ammonia from cyanamids that comprises conducting a cold suspension of a cyanamid in heat-interchanging relation with hot reaction products derived from the reaction of such a cyanamid suspension.

2. The process of producing ammonia that comprises conducting a cold suspension of calcium cyanamid and water in heat-interchanging relation with the hot reaction products derived from the reaction of such a suspension.

3. The process of producing ammonia that comprises advancing a cold suspension of calcium cyanamid and water in a continuous stream to a reaction zone, and conducting reaction products from such zone in heat-interchanging relation with an incoming portion of the said suspension.

4. Chemical reaction apparatus comprising structure defining a reaction zone, means operating under substantially atmospheric pressure for supplying reaction materials to the said reaction zone and for removing reaction products therefrom, and means for continuously maintaining sufficient hydrostatic pressure within the said reaction zone to substantially vary the reaction conditions therein.

5. Chemical reaction apparatus comprising structure defining a reaction zone, means operating under substantially atmospheric pressure for supplying reaction materials to the said reaction zone and for removing reaction products therefrom, and out of contact with the incoming reaction materials, and means for continuously subjecting the material in the said reaction zone to hydrostatic pressure.

6. Apparatus for producing ammonia from cyanamids and water comprising a vertical charging tube, a reaction chamber communicating therewith, a vertical discharge tower also communicating with the said reaction chamber and disposed adjacent to the said charging tube, and means for maintaining the contents of the charging tube and the discharge tower in homogeneous suspension.

7. Apparatus for producing ammonia from cyanamids and water comprising a vertical tube at least 60 feet in height, means for introducing pulverulent material and water therein, means for maintaining the contents of the tube in homogeneous suspension, a reaction chamber communicating with the lower end of the tube, means for heating the said reaction chamber, and means for removing reaction products from the said chamber.

In testimony whereof I have hereunto subscribed my name this 21st day of March, 1916.

WALTER O. SNELLING.